June 1, 1937. H. W. FOX ET AL 2,082,103
MULTIPLE SPINDLE DRILLING MACHINE CONTROL
Filed July 1, 1935 5 Sheets-Sheet 4
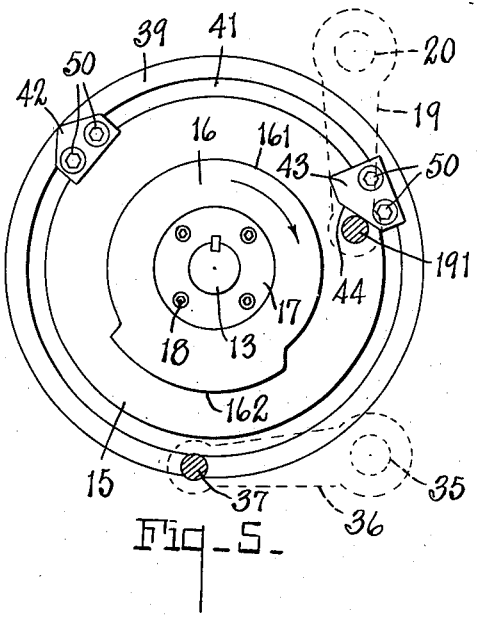
Fig. 5.
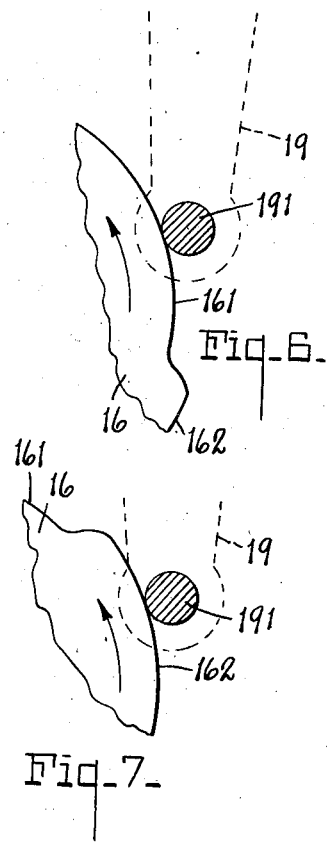
Fig. 6.
Fig. 7.
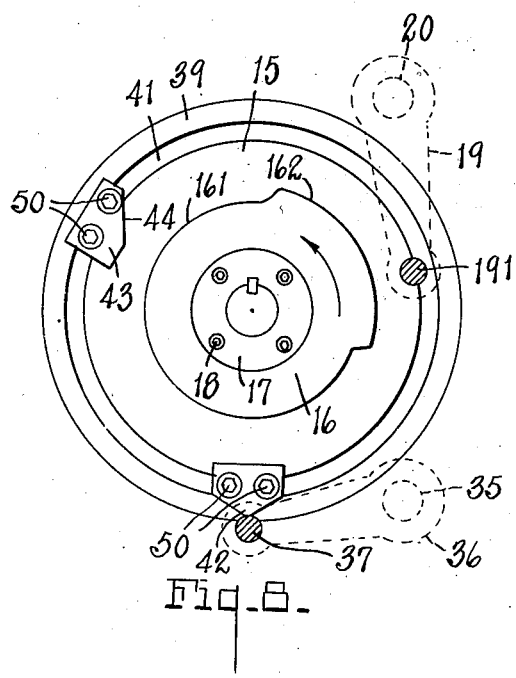
Fig. 8.
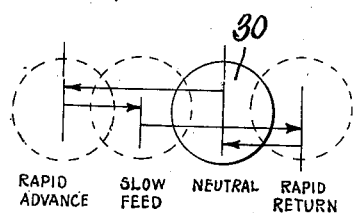
RAPID ADVANCE | SLOW FEED | NEUTRAL | RAPID RETURN
Fig. 9.
INVENTORS.
HIRAM W. FOX
AUSTIN A. RIDDELL
HOWARD D. CORWIN
BY
ATTORNEYS

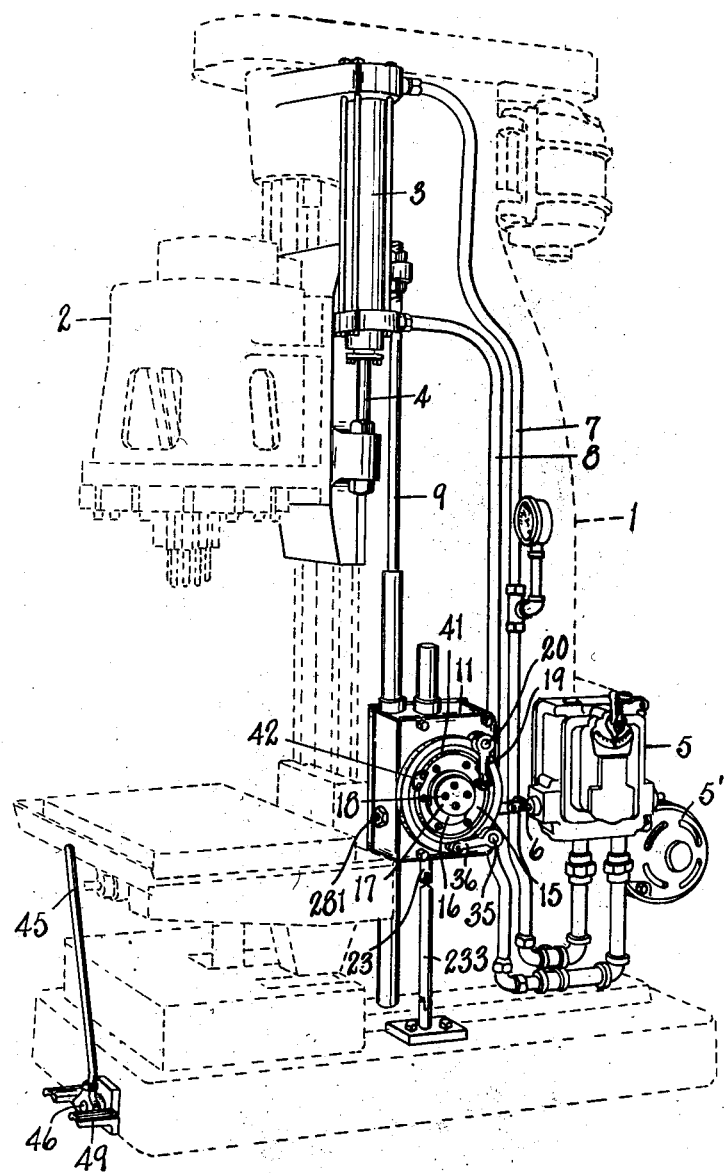
Fig_1_

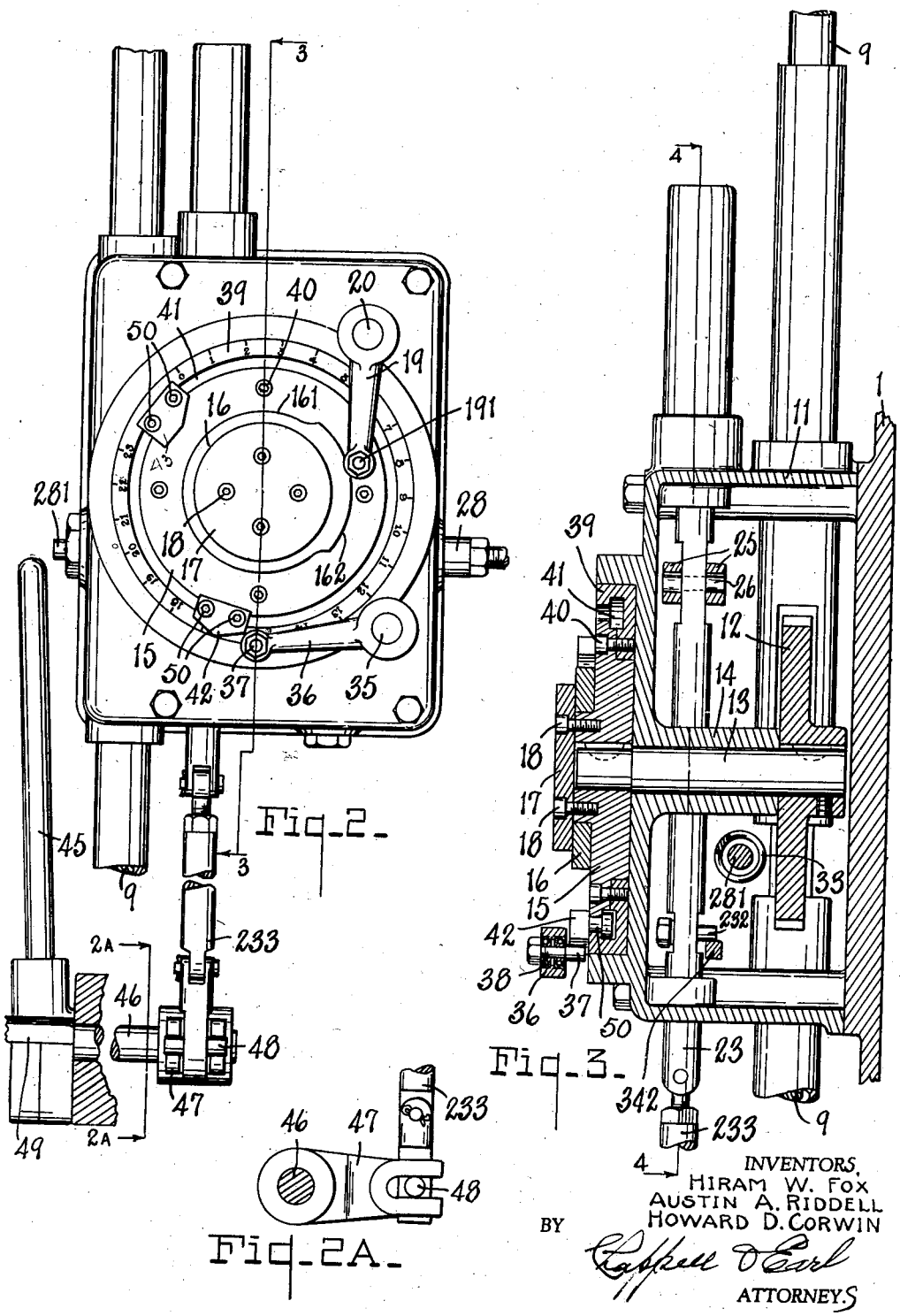

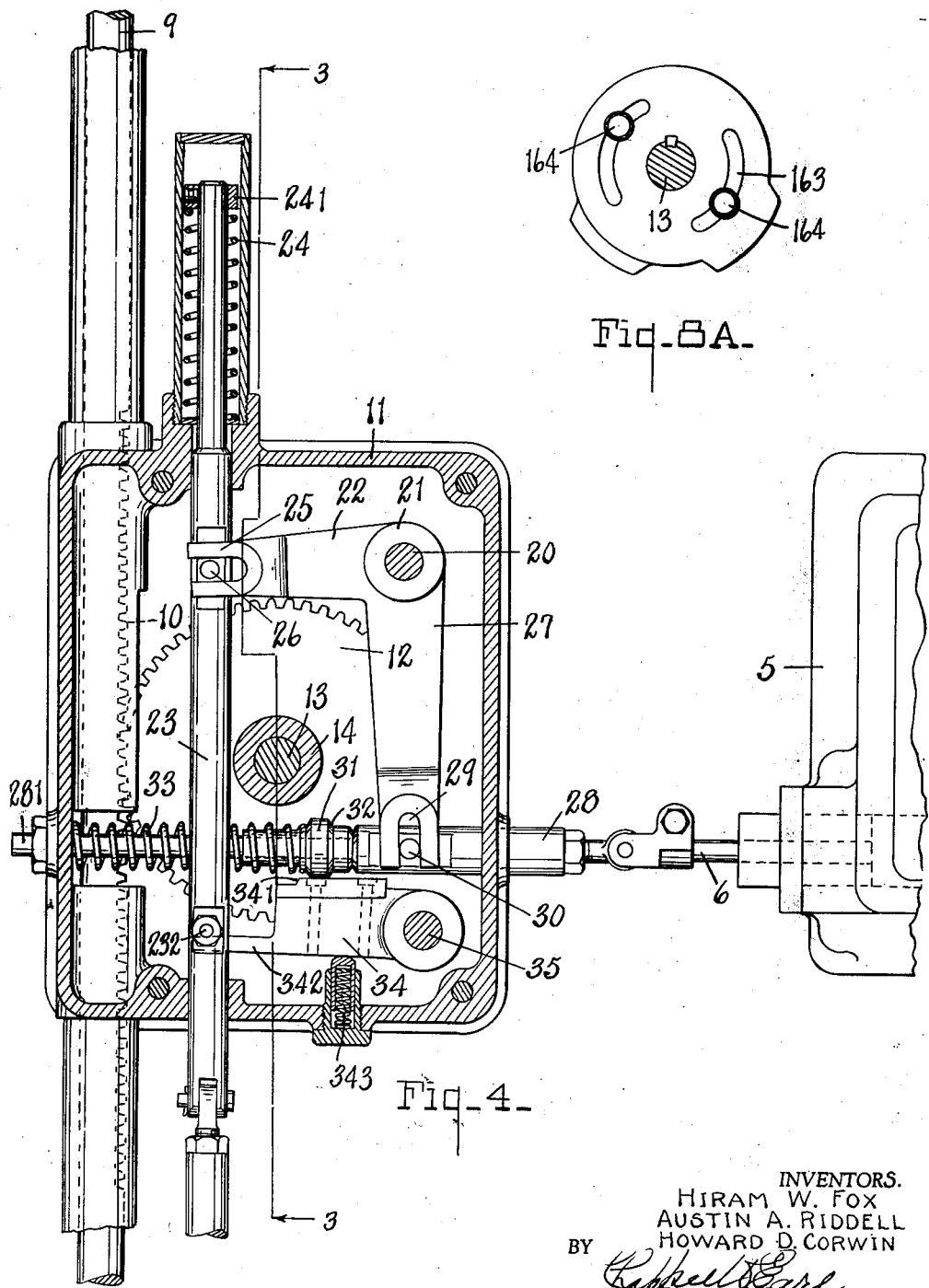

INVENTORS.
HIRAM W. FOX
AUSTIN A. RIDDELL
HOWARD D. CORWIN
BY
ATTORNEYS

Patented June 1, 1937

2,082,103

UNITED STATES PATENT OFFICE 2,082,103

MULTIPLE SPINDLE DRILLING MACHINE CONTROL

Hiram W. Fox, Austin A. Riddell, and Howard D. Corwin, Jackson, Mich., assignors to Fox Machine Company, Jackson, Mich.

Application July 1, 1935, Serial No. 29,346

2 Claims. (Cl. 60—52)

This invention relates to improved control means for multiple spindle drills, the invention being adapted to machine tools generally.

The main object of the invention is to provide the control in compact form readily adjustable to all the needs of quick return, rapid advance, effective feed rate, and complete control either manually or automatically.

Objects pertaining to details will appear from the description to follow.

We accomplish the objects of our invention by the mechanism illustrated in the acompanying drawings, in which:

Fig. 1 is a detail perspective view of our improved control mechanism as applied to a multiple spindle drill, the multiple spindle drill being indicated diagrammatically in dotted lines.

Fig. 2 is an enlarged detail elevation view of the control means separated from the variable pump and its control valve, the manual control lever and pedal and the other parts being in broken section.

Fig. 2A is a detail sectional elevation taken on line 2A—2A of Fig. 2, showing details of the connection for operating the control plunger.

Fig. 3 is an enlarged vertical sectional elevation, being only partially in section on the plane indicated by line 3—3 in Figs. 2 and 4.

Fig. 4 is an enlarged detail elevation partly in section on line 4—4 of Fig. 3, the control means being at neutral or in starting position.

Fig. 5 is a detail view of the oscillating cam means with the cam followers shown in section, other parts of the mechanism being omitted, the rocker arms being shown in dotted lines, and the mechanism being shown in the position of camming the control to the neutral point or point of beginning.

Fig. 6 is an enlarged detail of the cam disk and cam follower, a portion of the arm being shown dotted, indicating the relation of the parts during the rapid advance.

Fig. 7 is similar to Fig. 6, showing the cam follower with the cam advanced to the position of the feed or slow advance for feeding purposes.

Fig. 8 is a detail view similar to Fig. 5, showing the cam trip in operative position which permits the load and fire means to act and throw the valve to the rapid return position.

Fig. 8A shows a modification of the cam disk, the same being separated into a pair of plates adjustable on each other to provide a series alternately of rapid advances and slow feeds.

Fig. 9 is an enlarged detail diagram showing the different positions in relation to the valve that the cross pin on the valve control means assumes.

Figure 10:
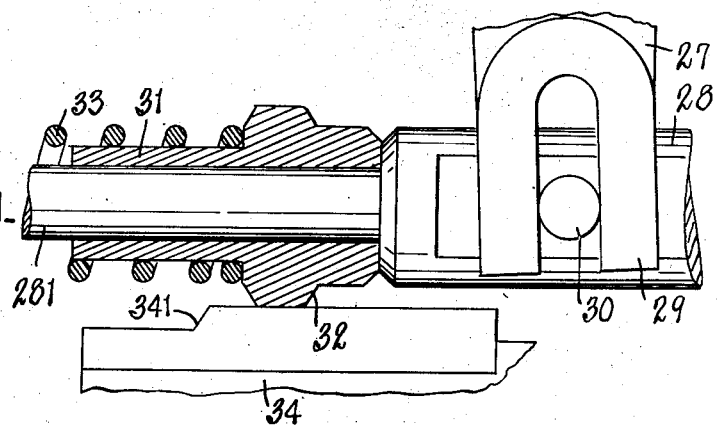
Fig. 10 is an enlarged detail of the control and its latch, showing the relation of the parts when the valve is at neutral.

The parts will be identified by their numerals of reference which are the same in all the views.

1 is a multiple spindle drill shown in dotted lines. 2 is the usual reciprocating head therefor which is controlled by our improved control means. 3 is the control engine cylinder with its piston. And 4 is the projecting piston rod connected to the movable head for its control by the action of the engine cylinder 3.

5 is a variable power pump preferably driven by the electric motor 5'. The pump is controlled by the valve control stem 6. The pump is connected by pipe 7 to the top of the cylinder 3 and by pipe 8 to the bottom of the cylinder. The pump delivers oil or other medium in the required volume and at the required speed to properly control the drill head 2 or other movable part of the machine tool. The pump is connected and controlled for a rapid return by delivery through pipe 8. Our connection automatically moves the control stem 6 to neutral position when the rapid return is completed. We then shift the stem from the neutral to the rapid advance by manual operation; it is then controlled automatically to the slow feed; then by the load and fire means it is shifted to the rapid return; and after the return is effected, it is automatically shifted to neutral by the stop cam 43.

It is possible to operate the load and fire means manually at any time that it is desired to stop the machine and effect the quick return.

The variable oil pump is no part of our invention as the same is a stock article and can be purchased in the market. We purchase and make use of the pump and complete unit manufactured by the Oilgear Company of Milwaukee, Wisconsin. A pump suitable for this device is shown in Ferris Patents No. 1,854,127, of April 12, 1932, and No. 1,753,562, of April 8, 1930. Consequently, we do not illustrate the details thereof, as it is not necessary to the complete explanation of our invention.

9 is the reciprocating connecting rod connected to the movable head 2 or other movable part of the machine tool that it is desired to control. This connecting rod is provided with a rack 10 which reciprocates the casing 11 of our improved control unit. The rack is in mesh with a gear 12 which it oscillates back and forth and by this means effects the control of the valve stem 6 of the "Oilgear" unit by the cam action.

The gear 12 is keyed or otherwise secured to the shaft 13 carried in suitable bearing 14 which is secured to the casing 11. The cam carrier or holder 15 is keyed to the front end of the shaft 13 and oscillates due to the action of the gear 12.

A central cam plate 16 is adjustably clamped in place by the clamp plate 17 by the screws 18. This cam plate has a lean portion 161 and a projecting or fat portion 162 and controls the rocker arm 19 which is carried on cam controlled feed rockshaft 20. The rocker arm 19 is provided with a revolvable cam follower pin 191 and as the portion 161, see Fig. 6, contacts with the follower pin 191, the mechanism is controlled for the rapid advance, and when the cam rocks so that the fat portion 162 engages the follower the slow feed is secured. These two positions are indicated in Fig. 9 and are marked respectively Rapid advance and Slow feed. On the cam controlled feed rockshaft 20 is mounted the control bell crank arm or bent lever 21 having a forked arm 22 which is slotted at 25 to embrace the actuating cross pin 26 carried by the control plunger 23 which is urged upward by compression spring 24. There is clearance provided for the pin 26 in the slot 25.

Arm 27 on cam controlled rockshaft 20 actuates the main control plunger 28 which is connected to control the valve stem 6 of the "Oilgear" unit. This arm 27 extends downward, the lower end being bifurcated to embrace the main plunger 28 and being slotted at 29 where it engages the cross pin 30, so that when the cam controlled rockshaft 20 is rocked to and fro it controls the movements of the main plunger 28.

In Fig. 9 is a diagram showing the action. The pin 30 is much enlarged and its four separate positions are indicated by dotted lines, the arrows indicating the series of movements step by step. Thus, as the rocker arm 19 is actuated by the cam 16, it controls the movement of the rapid advance and the slow feed as indicated.

The load and fire means is simple. The main control plunger 28 has an extension 281 of reduced dimension on which is a sliding collar 31 with engaging shoulder 32. Coiled compression spring 33 is disposed on the reduced shank portion 281 and reacts between the collar and the side of the casing, forcing the collar towards the right as seen in Fig. 4. A latch arm 34 with engaging notch 341 is carried by the tripping rockshaft 35, being suitably secured thereto. The rockshaft 35 extends through the front of the casing and carries rockshaft arm 36 which is provided with a cam follower pin 37, the same being supported rotatably by the ball bearing 38, see particularly Fig. 3. Spring 343 is provided for latch 34.

Figure 11:
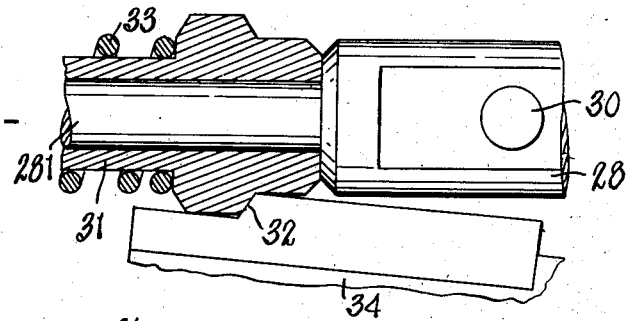
Fig. 11 is an enlarged detail similar to Fig. 10, of the relation of the parts when the valve is swung to the rapid advance.
Figure 12:
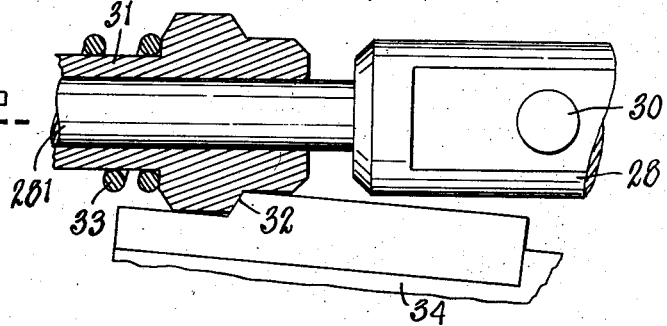
Fig. 12 is an enlarged detail similar to Fig. 10, showing the relation of the parts for the feed which is relatively slow.
Figure 13:
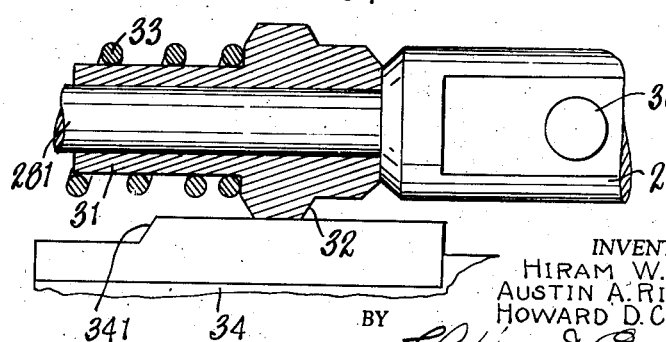
Fig. 13 is a similar view showing the position of the parts when the load and fire device has been tripped and the valve is pushed to the rapid return.

Surrounding the cam holder 15 is a supporting ring 39 supported by the clamping screws 40. Between the ring 39 and the cam carrier plate 15 is formed the T-shaped annulus 41 which serves to engage the heads of adjusting bolts as 50 for carrying tripping cam 42 for tripping the cam follower 37 and actuating the arm 36 to actuate the tripping rockshaft 35 to permit the action of the load and fire mechanism. I provide the stop cam 43 also held by screws 50 with a camming surface 44 for the actuation of the arm 19 on the cam controlled feed shaft 20 to shift the same to neutral position and stop the machine. The detail of how this is accomplished will be seen in Fig. 8. Trip cam 42 is adjustable along this annulus, as seen in Fig. 8 where it is acting upon the pin 37. When the cam holder 15 is rotated so that this trip cam 42 strikes and acts upon the pin 37, it pulls down the latch arm 34 which has engaged the shoulder 32 as indicated in Figs. 11 and 12, whereupon the collar acted upon by the spring 33 drives the plunger 28 towards the right and shifts the pin 30 to the position of Rapid return. The motion of the cam holder 15 is at once reversed and this brings the stop cam 43 into action. The latter is adjustable along the same annulus as the trip cam 42 and has an angled front cam surface 44 which cams the pin 191 and thus reacts to swing the rockshaft 20 and its arm 27 to carry the pin 30 to the Neutral position as indicated diagrammatically in Fig. 9. The action of camming is clearly shown in Fig. 5.

The control plunger 23 is held yieldingly upward by the compression spring 24 as already described, the latter acting under the stop collar 241 at the top of the plunger. A cross pin 232 is carried by the plunger 23 and is disposed to act upon extension 342 of the latch 34. The plunger 23 is actuated by the hand lever 45 controlling rockshaft 46 which is provided with a bifurcated arm 47 which engages cross pin 48 on link extension 233 of the plunger 23 either to raise or to lower the same. The hand lever 45 is also provided with a cross pedal 49 which enables the operator to operate the same either with his foot or with the hand lever as desired.

With the structure standing at neutral, as seen in Fig. 10, the operator steps on the left hand extension of the pedal 49 or moves the hand lever 45 to the left, as seen in Fig. 1. This raises the arm 22 and swings the arm 27 towards the left, as seen in Fig. 4. This slides the control plunger 28 to the left and the plunger through its engagement with the collar 31 slides the collar to the left until the shoulder 32 thereon is engaged by the latch 34, compressing the spring 33 and loading the load and fire mechanism. This movement of the control plunger 28 sets the control at rapid advance as indicated in the left hand circle in Fig. 9. The plunger 28 is free to move through the collar 31 without unlatching the shoulder 32 from the latch 38 so that the plunger 28 may be moved to the right to put the control in the low speed working position when the cam 16 revolves. The cam 16 then revolves the lean portion 161 in engagement with the follower pin 191 which then passes on to the enlarged or fat portion 162 which shifts the pin 30 to the slow feed position and the pin continues in this path until the trip cam 42 acts upon the pin or cam follower 37, trips the latch 34, and releases the collar 31. The spring 33 then acts to throw the same to the extreme right position or what is indicated in Fig. 9 as the Rapid return. This reverses the movement of the cam as indicated by the arrow in Fig. 5, and the trip cam 43 is swung into engagement with the pin 191 and through the connecting levers shifts the pin 30 carrying with it the control plunger 6 to the neutral position, thus completing the cycle of the machine.

If it is desired to stop the machine for any purpose, the operator throws the lever 45 to the right, which acts by the pin 232 to trip the latch 34 and permits the load and fire device to act in whatever position the mechanism may be, causing its quick return and, as soon as the cam 43 can act, stopping the machine in neutral position.

In Fig. 8A we show the cam plate divided, the two plates being each provided with a cam projection beyond the main cam surface and being adjustable by slots 163 and set screws 164. When this cam, which is illustrated in Fig. 8A, is employed it is possible to have a rapid advance, a slow working feed, a second rapid advance and a second working feed. The cam may be adjusted to give these results and the high points on the cam engage the cam follower 191 to accomplish this result.

We desire to claim the invention specifically and broadly as provided in the appended claims.

Having thus described our invention, what we desire to secure by Letters Patent is:

1. In a control means for a machine tool, the combination of an engine cylinder connected to control the movable part of said machine tool, a variable pump unit for delivering medium to and from said engine cylinder, means having a projecting longitudinally adjustable stem for controlling the delivery of the said pump, a suitable casing having a rotary oscillating cam carrier thereon connected by rack and pinion to the movable part of said machine tool, a cam controlled feed rockshaft in said casing having an arm with a cam follower, a cam on said carrier to actuate the said arm to control the movement of the feed rockshaft to control the rapid advance and slow feed of the movable part of said machine tool, a main control plunger for said stem, a rockshaft arm on said cam controlled feed rockshaft to control the said main plunger and said stem on rocking of said rockshaft, a load and fire means on said main plunger to carry said plunger and said stem from a forward feeding position past dead center to a reverse position, comprising a movable collar, and a compression spring for projecting the same, a tripping rockshaft in the said casing, a suitable latch thereon to engage the said collar, a control arm on the said tripping rockshaft having a cam follower, a trip cam carried by the cam carrier timed to trip the said latch to release the load and fire means, a trip cam on the said cam carrier positioned and timed to act upon the cam follower of the feed rockshaft arm to shift the same from reverse to neutral to stop the machine, a control plunger with connection to the main plunger to force it to the rapid feed position, and a trip cam thereon to trip the load and fire means when pushed in the opposite direction.

2. In a control means for a machine tool, the combination of an engine cylinder connected to control the movable part of the machine tool, a variable pump unit for delivering medium to and from said engine cylinder, means having a projecting longitudinally adjustable stem for controlling the delivery of the said pump, a suitable casing having a rotary oscillating cam carrier thereon connected by rack and pinion to the movable part of said machine tool, a cam controlled feed rockshaft in said casing having an arm with a cam follower, a cam on said carrier to actuate the said arm to control the movement of the feed rockshaft to control the rapid advance and slow feed of the movable part of said machine tool, a main control plunger for said stem, a rockshaft arm on said cam controlled feed rockshaft to control the said main plunger and said stem on rocking of said rockshaft, a load and fire means on said main plunger to carry said plunger and said stem from a forward feeding position past dead center to a reverse position, comprising a movable collar, and a compression spring for projecting the same, a tripping rockshaft in the said casing, a suitable latch thereon to engage the said collar, a control arm on the said tripping rockshaft having a cam follower, a trip cam carried by the cam carrier timed to trip the said latch to release the load and fire means, and a trip cam on the said cam carrier positioned and timed to act upon the cam follower of the feed rockshaft arm to shift the same from reverse to neutral to stop the machine.

HIRAM W. FOX.
AUSTIN A. RIDDELL.
HOWARD D. CORWIN.